United States Patent [19]
Taylor-McCune et al.

[11] Patent Number: 5,622,484

[45] Date of Patent: Apr. 22, 1997

[54] VALVE ARRANGEMENT FOR A CONDIMENT DISPENSING SYSTEM

[75] Inventors: Christopher J. Taylor-McCune, Mission Viejo; Brian J. Kurth, Anaheim; Lloyd D. Golobay, Huntington Beach, all of Calif.

[73] Assignee: Carr-Griff, Inc., Santa Ana, Calif.

[21] Appl. No.: 337,353

[22] Filed: Nov. 10, 1994

Related U.S. Application Data

[62] Division of Ser. No. 112,617, Aug. 26, 1993, Pat. No. 5,364,244.

[51] Int. Cl.$^6$ ............................................... F04B 53/10
[52] U.S. Cl. ..................... 417/393; 417/566; 137/855; 222/1; 222/334
[58] Field of Search ............................. 222/1, 334, 144.5; 417/389, 454, 395, 566, 565, 393; 137/527, 527.8, 852, 855, 858

[56] References Cited

U.S. PATENT DOCUMENTS

| | | |
|---|---|---|
| 860,255 | 7/1907 | Sjostrom . |
| 1,811,557 | 6/1931 | Ove . |
| 2,624,414 | 1/1953 | Harrell et al. ........................ 137/855 |
| 2,736,466 | 2/1956 | Rodth .................................. 222/334 |
| 2,926,692 | 3/1960 | Zillman et al. . |
| 3,238,890 | 3/1966 | Sadler et al. ........................ 417/536 |
| 3,370,305 | 2/1968 | Goott et al. . |
| 3,613,720 | 10/1971 | Welch . |
| 3,752,366 | 8/1973 | Lawrence, Jr. . |
| 3,825,154 | 7/1974 | Jaeger ................................... 417/395 |
| 4,124,147 | 11/1978 | Priese et al. ........................ 222/135 |
| 4,484,697 | 11/1984 | Fry, Jr. .................................. 222/334 |
| 4,514,742 | 4/1985 | Suga et al. . |
| 4,895,494 | 1/1990 | Gardner . |
| 5,158,210 | 10/1992 | Du ........................................ 417/395 |

FOREIGN PATENT DOCUMENTS

| | | |
|---|---|---|
| 246947 | 11/1960 | Australia . |
| 12935 | 2/1910 | Denmark . |
| 627884 | 5/1952 | United Kingdom . |
| WO/18305 | 9/1993 | WIPO .................................. 417/395 |

Primary Examiner—Timothy Thorpe
Assistant Examiner—Roland G. McAndrews, Jr.
Attorney, Agent, or Firm—Frank J. Uxa

[57] ABSTRACT

New valves to allow or prevent material flow through a conduit are disclosed. Such valves comprise a valve seat having a longitudinal axis, defining a through opening and including a seating surface which defines a portion of the through opening. A valve body, operatively coupled to the valve seat, is located at least partially in the through opening. A valve element is secured to and movable relative to the valve body. The valve element includes a sealing surface which is curved in at least one plane parallel to and including the longitudinal axis of the valve seat and is adapted to contact the seating surface to prevent material flow through the through opening. Pump assemblies and condiment dispensing systems employing such valves are also disclosed.

18 Claims, 2 Drawing Sheets

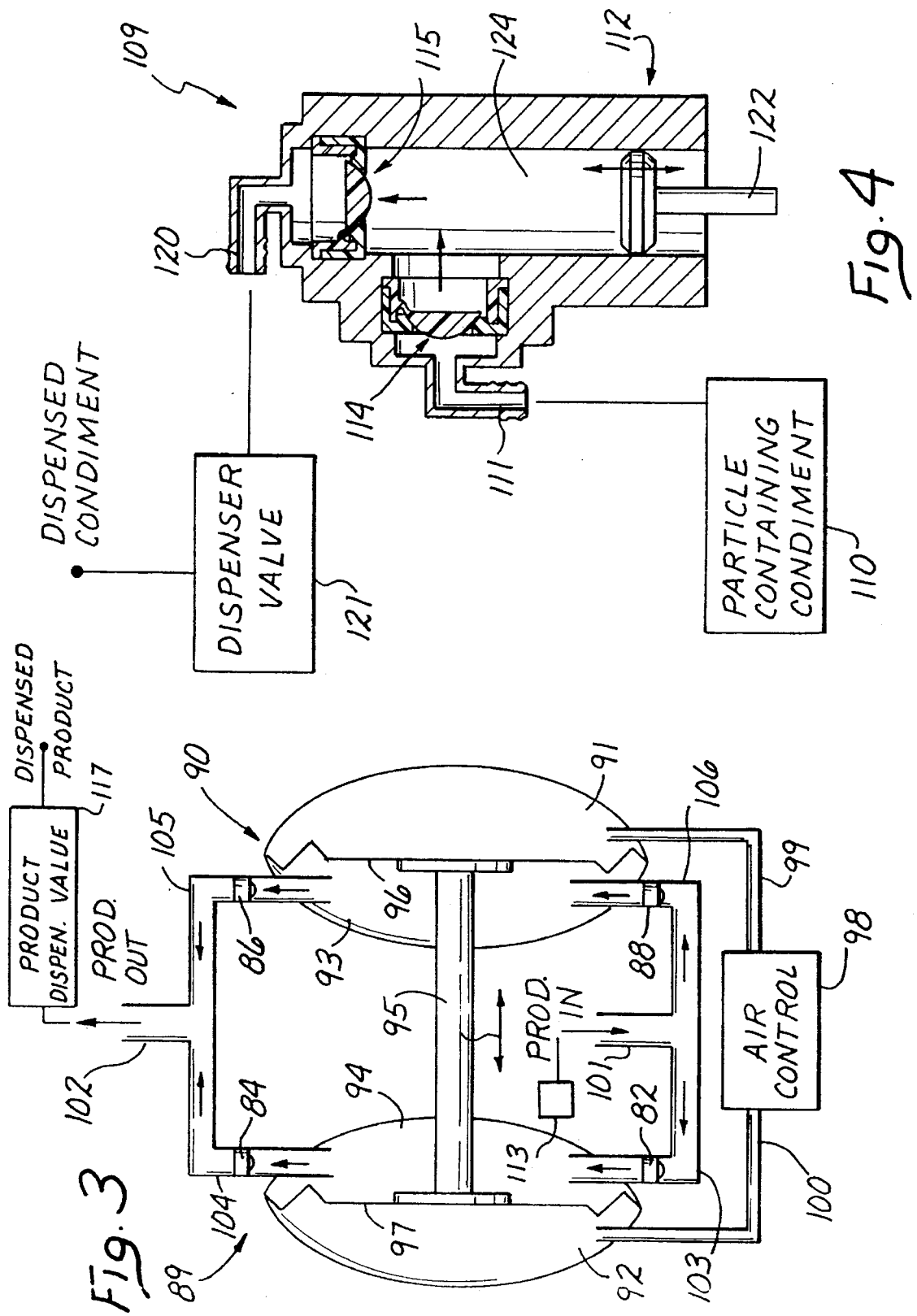

VALVE ARRANGEMENT FOR A CONDIMENT DISPENSING SYSTEM

This application is a division of application Ser. No. 08/112,617, filed Aug. 26, 1993, now U.S. Pat. No. 5,634,244.

BACKGROUND OF THE INVENTION

The present invention relates to check valves, and to pump assemblies and condiment dispensing systems employing such check valves. More particularly, the present invention relates to check valves which are straight forward in construction, easy to manufacture, and effective and durable in use, for example, in combination and conjunction with pump assemblies, such as those used in dispensing condiments and the like.

The typical condiment dispensing system involves a supply of condiment to be dispensed; a pump mechanism, such as a diaphragm pump, used to pump the condiment from the condiment supply; and to a valved dispensing conduit through which the pumped condiment is passed for use. The valve or valves included in the valved dispensing conduit are activated, as desired, to release a quantity of condiment from the dispensing system for use.

Check valves are normally used in combination with the pumping mechanism to provide for effective and efficient pumping of condiments from the condiment supply to the valved dispensing conduit. Examples of check valves which are typically used include so-called "flapper" valves and so-called "ball" valves.

The flapper valves typically involve a substantially flat valve element which is pivotably movable so as to be over or away from an opening in a conduit. Such flapper valves have certain disadvantages. For example, the durability of such valves is a concern, particularly in operations, such as condiment dispensing systems, where the check valve is repeatedly and frequently opened and closed. Because the flapper valve element typically is positioned on top of the opening to prevent flow, as the valve element wears, the valve becomes susceptible to blow- through, that is material passes across the valve when the valve is nominally closed so that the valve becomes ineffective to prevent the flow of material, as desired. In addition, if the flapper valve element is connected in an unbiased manner, a substantial and disadvantageous time delay in valve closing can occur, thus reducing the efficiency of the pump mechanism. On the other hand, if the flapper valve element is connected so as to have a "closed-position" bias, the biasing member, often a spring, adds complexity to the valve, increases the risk of mechanical failure and often occupies a portion of the conduit and thereby, at least to some extent, restricts material flow through the conduit when such flow is desired.

The ball valves typically used as check valves involve a spheroidal ball which can be positioned in a valve seat to prevent material flow. The ball remains located in the conduit, downstream of the seat, when material flow is to be allowed through the conduit. Such valves also have certain disadvantages. For example, the ball tends to become worn and/or wear the valve seat so that the valve becomes less and less effective over time, particularly in operations which the valve is opened and closed frequently. Also, even when the ball is away from the seat to allow material flow, the ball itself acts as an impediment to the flow of material. Springs and/or other biasing members may be used in ball values, but have substantially the same disadvantages discussed above with regard to flapper values.

Both of these typically used valves have substantial difficulties when the material being processed, for example, the condiment to be dispensed, includes particles or particulate material. The particulate material tends to adversely affect the seating of the valve element, thereby rendering the valve ineffective in preventing material flow, when such prevention is desired.

It would be advantageous to provide new check valves which overcome one or more of the problems of the prior check valves, for example, as described above.

SUMMARY OF THE INVENTION

New check valves, and pump assemblies and condiment dispensing systems employing such check valves have been discovered. The present check valves are straight forward in construction and design. Rapid and effective valve closing is achieved when flow prevention is desired. The present valves are preferably configured so that they can be placed in a conduit in a manner which substantially reduces or even eliminates placement errors. No O-rings or other internal sealing means are required because of the integral construction of the valves. The present valves are preferably biased to prevent material flow, more preferably through a natural spring return and without a separate biasing member or spring. Efficient use of space is achieved so that materials having relatively high concentrations of particles and/or relatively high flow rates of material can be accommodated across the present valves.

The present valves are designed to increase pump priming capabilities. A preferred combination of hard and soft valve materials of construction creates a very effective dry-prime. The components of the present valve are preferably coupled along a tortuous path, in an overlapping orientation which prevents material entrapment. The unique combination of a curved sealing surface on the valve element and an angled seating surface on the valve seat allows the valve to handle relatively high pressures, while reducing or even eliminating valve blow-thru. Further, the relatively large opening through the valve promotes high capacity flow of Newtonian and Non-Newtonian fluids, of high to low viscosity, with or without particles or particulates, utilizing a reduced, or even minimized, drive force.

In one broad aspect, the present invention is directed to valves for placement in a conduit to allow or prevent material flow through the conduit, as desired. Such valves comprise a valve seat, a valve body, and a valve element. Although the valve seat and valve body can be formed as a single piece, it is preferred that these two components be two separate pieces. The valve seat has a longitudinal axis and defines a through opening. The valve seat includes a seating surface which defines a portion of the through opening. The valve body is operatively coupled to the valve seat and is located at least partially in the through opening. The valve element is secured to and movable relative to the valve body. The valve element and valve body are preferably a single piece, that is the valve element and valve body are preferably integrally formed.

The valve element includes a sealing surface which is curved in at least one plane including the longitudinal axis of the valve seat. This sealing surface is adapted to contact the seating surface, which is preferably angled in at least one plane including the longitudinal axis of the valve seat, to prevent material flow through the through opening. Thus, the seating surface is preferably angled so as note to be parallel (or perpendicular) to the longitudinal axis of the valve seat in at least one plane including this longitudinal axis. The seating surface, preferably the angled seating surface, is preferably configured to come in contact with a portion of the sealing surface when the valve is to prevent flow. In a particularly useful embodiment, the seating surface has a substantially conical configuration, for example, in the shape of a truncated right circular cone, and the seating surface has a substantially spheroidal configuration. The combination of the valve element secured, preferably integrally secured, to the valve body and a curved sealing surface which comes in contact with a seating surface, preferably an angled seating surface, of the valve seat provides for very effective valve alignment and operation.

The valve element is preferably solid, that is includes no hollow internal space. The use of a solid valve element facilitates the rapid and effective closing or seating of the valve element. The valve element is advantageously made of a material which is softer than the material from which the valve seat is made. In one useful embodiment, the valve element includes a relatively hard core, preferably having the same configuration as the overall valve element, surrounded by an outer coating, which includes the sealing surface, and is made of a material which is softer than the material from which the core is made. Each of these features, singly or in any combination increases the rapidity with which the valve is closed and enhances the effectiveness of the valve. In addition, because the present valves are very effectively closed and sealed even in a dry condition, the ease with which a pump mechanism associated with such a valve can be effectively primed is significantly increased. The valve element preferably extends beyond the seating surface away from the valve body when the seating surface contacts the seating surface to prevent material flow through the through opening.

The valve element is preferably secured to the valve body in such a manner so as to have a bias to prevent material flow through the through opening. Thus, with no material present in contact with the valve, this biasing acts to urge the sealing surface of the valve element into contact with the seating surface of the valve seat. This biasing feature facilitates effective priming, even dry priming, of a pump mechanism associated with the valve.

Although the valve element has a curved sealing surface, it preferably includes a substantially flat surface, preferably substantially perpendicular to the longitudinal axis of the valve seat when the sealing surface contacts the seating surfaces to prevent material flow through the through opening, located proximally of the distal most portion of the sealing surface. This substantially flat surface allows for an increased portion of the through opening to be available for material flow when such flow is desired. This, in turn, allows increased material flow rates across the valve and/or increased concentrations of particles in the material passing across the valve. This is a substantial advantage of the present valve, for example, relative to a typical ball valve in which the ball obstructs a significant, even a substantial, portion of the flow path across the valve.

The valve seat, valve body and valve element together define a walled, open ended, substantially annular space adjacent the sealing surface when the sealing surface contacts the seating surface to prevent material flow through the through opening. This "annulus" very effectively facilitates the rapid closing of the valve to prevent material flow, as desired. For example, with valves employing this feature, the material included in the entire open space of the conduit downstream from the seating surface is brought to bear on the valve element when flow prevention is desired. Also, this feature facilitates effective seating of the sealing surface onto the seating surface even when the material includes particles.

In a very useful embodiment, the valve seat and valve body are formed of two separate pieces which are operatively coupled along a tortuous path of mutually engaging and overlapping surfaces. This feature reduces the amount of material, in particular particle-containing material, held up between the valve seat and the valve body so that the valve remains clean and useful in systems for dispensing food products, for example, condiments, for relatively long periods of time.

In essence, the present valves provide many of the advantages of the flapper valves and ball valves previously used, while, at the same time, not having the disadvantages of such valves. In other words, the present valves provide the advantages obtained using the ball valve and the flapper valve without the disadvantages of using such previously known valves. For example, the present valves provide a much more effective and durable seal than typical flapper valves. Further, the present valves allow for higher flow rates and/or flow of materials with higher concentrations of particles than do typical ball valves.

The present valves are particularly useful in combination with a pumping mechanism, such as a diaphragm pump. Very useful advantages and benefits are obtained when the valves are used to control material flow between a two chamber pump mechanism, for example, a two chamber diaphragm pump. Pump assemblies including one or more of the present valves are included within the scope of the present invention.

In another broad aspect of the present invention, condiment dispensing systems are provided which include a condiment reservoir containing a supply of condiment to be dispensed, for example, a particle-containing condiment. A pump sub-system or assembly is provided in communication with the condiment reservoir to provide condiment from the condiment reservoir to a valved conduit through which the condiment is dispensed for use, as desired. The pump sub-system includes a pump inlet and a pump outlet each of which preferably includes a valve in accordance with the present invention. Methods for dispensing condiment, for example, using a condiment dispensing system as described herein, are also disclosed. Such condiment dispensing systems and methods for dispensing condiment are included within the scope of the present invention.

These and other features, aspects and advantages of the present invention will-become apparent hereinafter, particularly when considered in conjunction with the following claims and detailed description in which like parts bear like reference numerals.

BRIEF DESCRIPTION OF THE DRAWINGS

FIG. 3 is a schematic illustration of a pump assembly employing valves in accordance with the present invention.

FIG. 4 is a schematic illustration of a condiment dispensing system in accordance with the present invention.

DETAILED DESCRIPTION OF THE INVENTION

Figure 1:
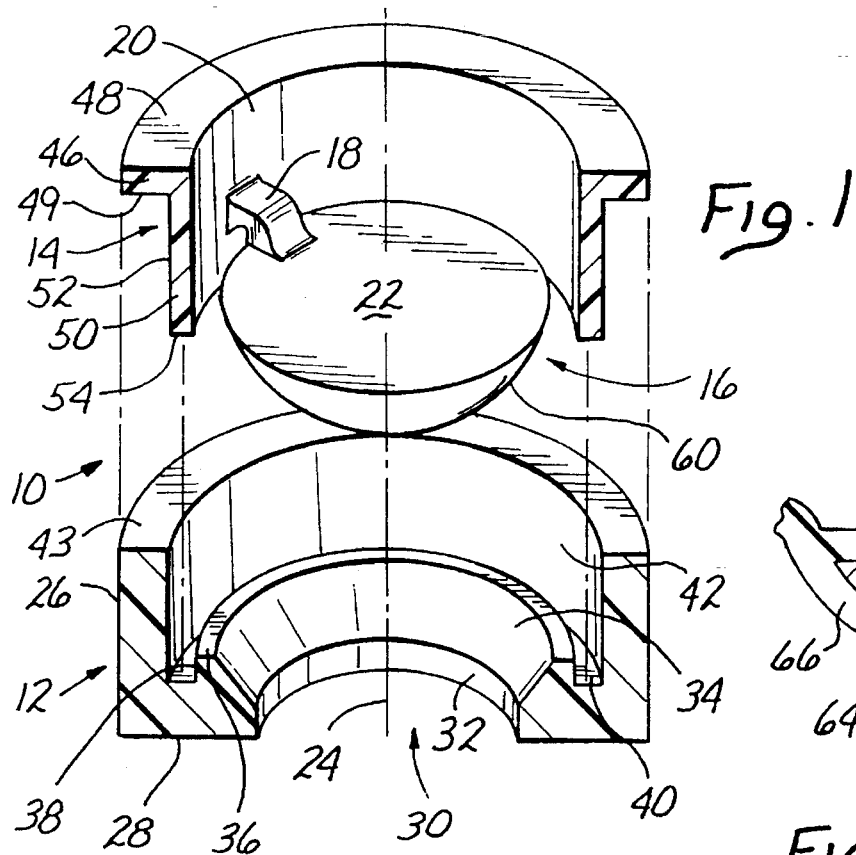
FIG. 1 is a top front perspective view, partly in cross-section, of a valve in accordance with the present invention, showing certain of the components of the valve separated for illustrative clarity.
Figure 2A:
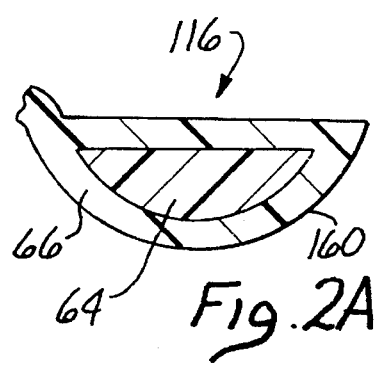
FIG. 2A is a cross-sectional view showing an alternate embodiment of a valve element in accordance with the present invention.
Figure 2:
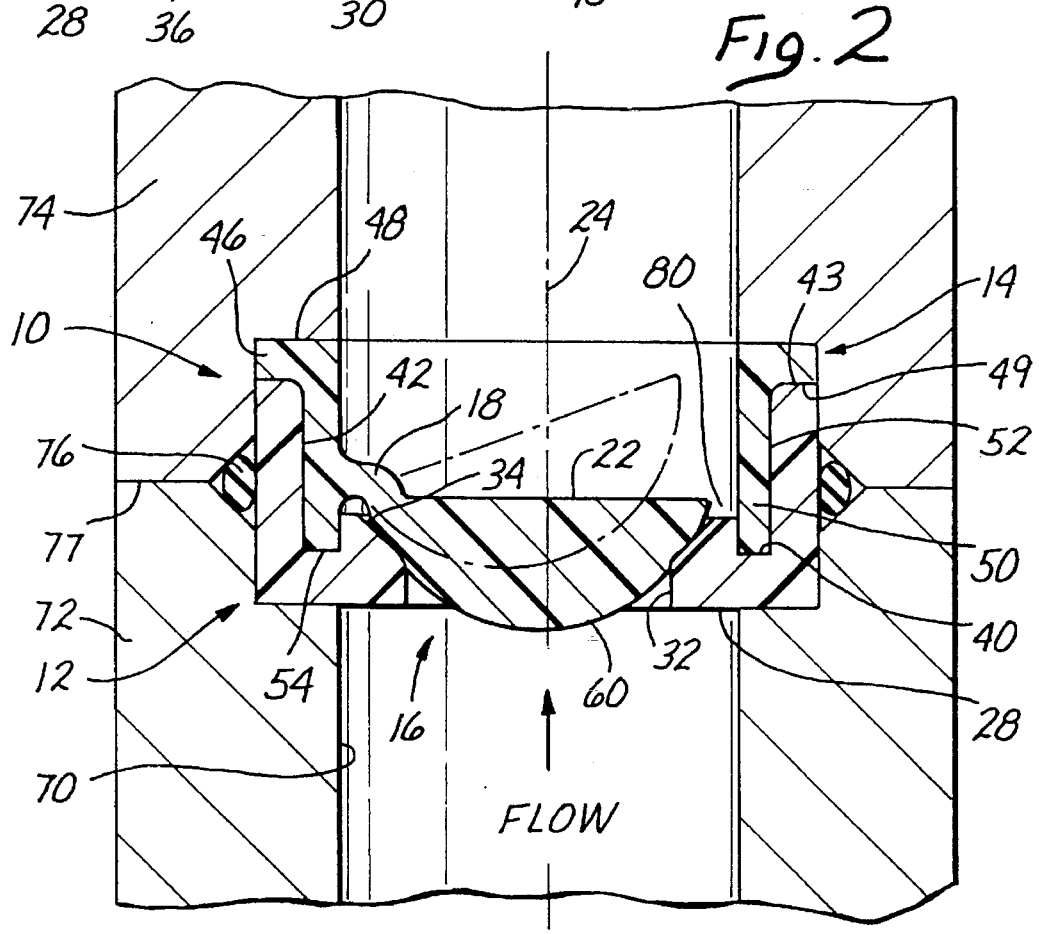
FIG. 2 is a cross-sectional view of the valve shown in FIG. 1 in use in a conduit.

With reference to FIGS. 1 and 2, a valve, shown generally at 10, includes a seating member 12, a body member 14 and a valve member 16. A hinge 18 is included in body member 14 and runs from the interior sidewall surface 20 of body member 14 to the top surface 22 of valve member 16. Valve member 16 is secured to body member 14 by hinge 18. Each of the components of valve 10 is preferably formed, for example, molded and/or otherwise produced using conventional techniques, from polymeric materials. However, other materials of construction can be employed. Body member 14, including hinge 18, and valve member 16 are made as a single integral component. Although valve 10 is illustrated as involving two separate pieces or components, single or one piece valves can be produced, for example, using conventional plastic forming techniques, including the features of the present invention and, therefore, are included within the scope of the present invention.

Seating member 12 has a longitudinal axis 24 which is parallel to outer sidewall surface 26 of the seating member, which outer sidewall surface has a right circular cylindrical configuration. Seating member 12 further includes a bottom surface 28 which is perpendicular to longitudinal axis 24. Through opening 30 is defined by seating member 12, in particular by lower interior sidewall surface 32, seating surface 34, top ridge surface 36, ridge sidewall surface 38, intermediate surface 40 and inner sidewall surface 42 of the seating member.

As shown in FIGS. 1 and 2, lower interior sidewall surface 32 has a right circular cylindrical configuration. Top ridge surface 36 and intermediate surface 40 are oriented perpendicular to longitudinal axis 24. Ridge sidewall surface 38 and inner sidewall surface 42 each is structured to have a right circular cylindrical configuration. Seating member 12 also includes a top surface 43 which is oriented perpendicular to the longitudinal axis 24.

Body member 14 includes a flange 46 which has a top surface 48 and a bottom surface 49. Top surface 48 and bottom surface 49 of flange 46 are oriented perpendicular to longitudinal axis 24. A sidewall 50 extends downwardly from flange 46 and has a right circular cylindrical configuration. Sidewall 50 includes an outer sidewall surface 52 and inner sidewall surface 20, and a bottom surface 54.

When body member 14 is operatively coupled to seating member 12, as shown in FIG. 2, bottom surface 49 of flange 46 fits snugly on top of top surface 43, and outer sidewall surface 52 fits snugly against inner sidewall surface 42 of seating member 12. Also, the bottom surface of sidewall 50 fits snugly against intermediate surface 40, and the lower part of inner sidewall 20 fits snugly against ridge sidewall surface 38. Body member 14 can be adhesively secured to seating member 12. Alternately, these two components can be manufactured to sufficiently fine tolerances so that they can be coupled together without adhesive. Further, as noted above, the two components, that is the body member 14 and the seating member 12, can be formed as a single component. In the event that a two component system is used, as shown in FIGS. 1 and 2, the tortuous path of mutually engaging surfaces along which body member 14 and seating member 12 are coupled very effectively reduces or even eliminates material collecting in valve 10 during use.

Valve member 16 includes a curved sealing surface 60. That is, sealing surface 60 is curved in at least one plane including the longitudinal axis 24 of seat member 12. With specific reference to FIG. 2, the plane including longitudinal axis 24 can be considered to be the plane of the drawing or paper. As shown in FIG. 2, sealing surface 60 has a substantially spheroidal configuration and seating surface 34 has a substantially truncated right circular conical configuration. In particular, sealing surface 60 has an angled (in at least one plane including the longitudinal axis 24) configuration which is substantially complimentary to the configuration of seating surface 34. That is, when valve element 16 is positioned so that sealing surface 60 comes in contact with seating surface 34, a significant portion of the seating surface 34 is in contact with the sealing surface 60. This insures a substantial and effective valve seal so that material flow is effectively prevented, as desired, by valve 10.

Top surface 22 of valve element 16 is substantially flat. In particular, top surface 22 is oriented substantially perpendicular to longitudinal axis 24 when sealing surface 60 is in contact with seating surface 34, as shown in FIG. 2. Valve member 16 hah a substantially semi-spheroidal, for example, approaching a hemi-spheroidal, configuration. The curved sealing surface 60 very effectively provides for preventing flow of material, as desired. On the other hand, when flow is to be allowed across valve 10, the substantially flat top surface 22 of valve member 16 allows the valve member to be moved very much out of the way, for example, so that substantially flat top surface 22 approaches interior sidewall surface 20 at maximum flow. This feature allows valve 10 to accommodate high flow rates of material and/or materials which include relatively high concentrations of particles.

Valve member 16 is made of a material which is softer than the material from which the seat member 12 is made. This facilitates an effective seal when it is desired to prevent material flow. Also, this "soft-hard" seal enhances the priming capability of a pump mechanism associated with valve 10.

Sealing surface 60, when in contact with seating surface 34, extends beyond the bottom surface 28 of seating-member 12. This feature facilitates providing a very effective seal against material flow, when desired. In addition, substantially flat surface 22 has a larger area than the largest area perpendicular to longitudinal axis 24 defined by seating surface 34. This feature enhances (lengthens) the useful life of valve 10. Thus, over time, as seating surface 34 and/or sealing surface 60 wear, valve member 16 is able to move deeper and deeper into seat member 12 when it is desired to prevent flow and still provide an effective seal against flow.

With reference to FIG. 2A, an alternate embodiment of a valve member is shown generally at 116. Except as expressly stated herein, each of the elements of valve member 116 is structured and functions similarly to the corresponding element of valve member 16. Elements of valve member 116 which correspond to elements of valve member 16 have the same reference numeral increased by 100.

The primary difference between valve element 116 and valve element 16 involves insert 64. Insert 64 is produced from a harder material, for example, a harder polymeric material or metal, relative to the outer coating 66 of valve element 116. Outer coating 66 includes the sealing surface 160. With valve element 116, the advantages of a relatively soft sealing surface are retained while, at the same time, the relatively hard insert 64, which is configured substantially as the overall valve element 116 is configured, provides an additional amount of sealing force so that a valve including valve element 116 is very effective in preventing material flow, as desired, and is particularly useful at high pressure conditions to prevent valve blow-thru.

Hinge 18 performs a number of very useful functions. As noted above, hinge 18 provides securement for valve member 16 to body member 14. Not only does hinge 18 provide for such securement, but hinge 18 is structured and is sufficiently strong to maintain alignment between the valve member 16 and seating member 12. Thus, when valve 10 is to prevent material flow, valve member 16 is properly aligned so the sealing surface 60 makes effective contact with the seating surface 34 to prevent such flow. Further, it should be noted that hinge 18 is an integral part of the body member 14 and, thus, does not involve a separate mechanism which can require maintenance and may fail.

An additional important benefit is the biasing function performed by hinge 18, which is configured and structured to bias or urge sealing surface 60 into contact with seating surface 34. This biasing is accomplished without an external biasing member, for example, a spring or other mechanism. This biasing is very effective to provide a normally closed valve 10 and, for example, to provide effective pump priming capability, in particular dry priming capability.

The components of the present valve 10 can be made of any material of construction suitable for producing check valves.

With reference to FIG. 2, the assembled valve 10 is placed so as to control the flow of material through a conduit 70. Since valve 10 is biased in the closed position, it is very easy to properly place the valve if one knows the desired direction of material flow through conduit 70. This adds to the ease of using the present valves. Conduit 70 is defined by pipe segments 72 and 74 which are joined in a sealing relationship. An external O-ring 76 is provided to properly seal the junction 77 between pipe segments 72 and 74. Other sealing components, such as clamps and the like, which are not shown can be employed to hold pipe segments 72 and 74 in the sealing relationship shown in FIG. 2.

Again with reference to FIG. 2, a substantially annular space 80, which is open and defined by the top of sealing surface 60, ridge surface 36 and interior sidewall surface 20 provides substantial benefits. For example, this annular space 80 reduces the delay time in closing valve 10, when prevention of material flow is desired. Thus, when the valve 10 is desired to be closed, the force of the material downstream of valve 10 in conduit 70 is brought to bear on valve member 16 to force the valve member, and in particular sealing surface 60, into contact with seating surface 34 to prevent material flow. In addition, this annular space 80 reduces, or even minimizes, the disadvantageous possibility that particles in the flowing material will cause a problem in sealing the valve 10 shut.

Valve 10 operates as follows. With reference to FIG. 2, valve 10 is placed in conduit 70. With material flow occurring in the direction shown in FIG. 2, valve member 16 is forced away from seating surface 34 and flow is allowed across valve 10. When, for whatever reason, material flow is stopped in conduit 70, the natural biasing action of hinge 18 urges valve member 16 back toward and into contact with seating surface 34 to prevent any flow of material from downstream of valve 10 across the valve. Once material begins or resumes flowing in conduit 70 in the direction shown in FIG. 2, valve member 16 moves away from seating surface 34 and toward interior sidewall surface 20, as shown by the shadow lines in FIG. 2, to allow material to flow through through opening 30 and across valve 10. Also, if no material is present in conduit 70, the natural biasing action of hinge 18 urges valve sealing surface 60 into contact with seating surface 34. Thus, in a "dry" condition, that is with no pumpable liquid in conduit 70, valve 10 is effectively closed. This feature allows a pump mechanism associated with conduit 70 and valve 10 to be effectively primed, even in this dry condition, to facilitate the commencement of pumping of material through conduit 70.

With reference to FIG. 3, four valves, indicated at 82, 84, 86 and 88 are shown in use in a pump assembly 89 in combination with a two chamber, gas driven diaphragm pump 90. Each of the valves 82, 84, 86 and 88 is structured identically and in a manner similar to valve 10.

Pump 90 includes a first gas chamber 91, a second gas chamber 92, a first product chamber 93 and a second product chamber 94. A piston 95 is joined at one end to a first flexible diaphragm 96 and a second flexible diaphragm 97 at the other end. An air control assembly 98, which can be of conventional design, operates to provide pressurized air through first gas conduit 99 and second gas conduit 100 to the gas chambers in a sequential manner to cause piston 95 to reciprocate as shown in FIG. 3. The valves 82, 84, 86 and 88 effectively cooperate with pump 90 to enhance the priming capabilities of the pump and, thereby, facilitate effective start-up of the pump. In this manner, the volume of first product chamber 93 is reduced as the volume of second product chamber 94 is increased and vice versa. This creates a pumping action which pumps product through product conduits 103, 104, 105 and 106 in which valves 82, 84, 86 and 88 are located, as shown by the product flow arrows in FIG. 3.

Pump assembly 89 operates as follows. Material or product, for example, a particle-containing condiment from a source or reservoir 113 of such material, enters pump assembly 89 through product inlet conduit 101. With no material flowing through the product conduits, each of the valves 82, 84, 86 and 88 is closed. When it is desired to pump product to product outlet conduit 102, pump 90 is activated to cause piston 95 to reciprocate. As the volume of first product chamber 93 and second product chamber 94 is, in turn, increased, valve 88 and valve 82, respectively, opens to allow product from product inlet conduit 101 to pass into product conduit 106 and product conduit 103, respectively, and then into the first product chamber and the second product chamber, respectively. During the time the volume of first product chamber 93 and second product chamber 94 is, in turn, increased, valve 86 and valve 84, respectively, is closed. As the volume of first product chamber 93 and second product chamber 94 is, in turn, reduced, valve 88 and valve 82, respectively, is closed, and valve 86 and valve 84, respectively, opens to allow product to flow through product conduit 105 and product conduit 104, respectively, and into product outlet conduit 102, as desired.

This operation is continued so that product outlet conduit 102 is provided with a pressurized supply of product which is available to be dispensed using product dispenser valve 117 in the product outlet conduit, as desired on demand. The present valves 82, 84, 86 and 88 function very effectively in this type of a system which involves very frequent valve opening and closing. Thus, the present valves are very durable, effectively protect the pump 90 from back flow of product, effectively promote the efficiency of the pump provide very effective priming capabilities to the pump and, in general, are very effective in such use.

A condiment dispensing system, shown generally at 109, is illustrated in FIG. 4. A reservoir of particulate-containing condiment 110 may include a conventional "in-the-bag" supply of bulk condiment which is used in restaurants or other similar type establishments. Such particle-containing condiments include, for example, thousand island dressing, tartar sauce and the like. The condiment from this reservoir 110 is passed into a pumping mechanism, shown schematically at 112. It should be noted that pumping mechanism 112 can be replaced by double chamber diaphragm pump 90.

Valves 114 and 115 are shown associated with pumping mechanism 112. Each of these valves 114 and 115 is constructed identically and in a manner similar to valve 10. The condiment from the pumping mechanism passes through outlet 120 to a dispenser valve which can be operated, for example, manually operated, as desired to provide the dispensed condiment.

The system 109 operates as follows. A piston 122, for example, a gas driven piston, is caused to reciprocate in a pumping chamber 124 of pumping mechanism 112. As the volume of pumping chamber 124 increases, inlet valve 114 opens and outlet valve 115 is closed. This causes condiment from reservoir 110 to pass through pump inlet 111 across valve 114 and into pumping chamber 124. As the piston 122 reciprocates to reduce the volume of chamber 124, inlet valve 114 is closed and outlet valve 115 opens. The force of piston 122 causes condiment to pass across outlet valve 115 into outlet 120 where it is available for dispensing, as desired, by activating dispenser valve 121.

The present valves provide very effective and convenient flow control for pumping mechanisms used to dispense condiments, in particular particle-containing condiments. The present valves provide effective priming capabilities to such pump mechanisms, even in the dry condition. Also, such valves are straight forward in construction, relatively easy to manufacture and are very durable in use, in particular in situations where check valves are moved between the opened and closed positions very frequently. Very effective sealing is provided so that undue wear and tear on the pumping mechanism is reduced, or even minimized. In short, the present valves have outstanding characteristics and provide substantial benefits when compared to prior art systems.

While this invention has been described with respect to various specific examples and embodiments, it is to be understood that the invention is not limited thereto and that it can be variously practiced within the scope of the following claims.

What is claimed is:

1. A system for dispensing a condiment comprising:
   a condiment reservoir containing a supply of condiment to be dispensed;
   a pump sub-system including a pump inlet in communication with said condiment reservoir, a pump outlet and a pump assembly for pumping condiment from said condiment reservoir through said pump inlet and through said pump outlet; and
   a valved conduit in communication with said pump outlet and structured to allow condiment from said pump outlet to flow therethrough, as desired, each of said pump inlet and said pump outlet including a valve comprising:
   a valve seat element having a longitudinal axis, defining a through opening and including a seating surface which defines a portion of said through opening;
   a valve body element positioned in said pump inlet or said pump outlet and operatively coupled to said valve seat element and located at least partially in said through opening, said valve body element including an inwardly facing interior sidewall; and
   a valve element secured to said valve body element at said inwardly facing interior sidewall and being movable relative to said valve body element, said valve element including a sealing surface which is curved in at least one plane including the longitudinal axis of said valve seat element and is adapted to contact said seating surface to prevent condiment flow through said through opening.

2. The system of claim 1 wherein said pump sub-system includes a diaphragm pump and said seating surface is angled in at least one plane including the longitudinal axis of said valve seat element.

3. The system of claim 1 wherein said seating surface has a substantially conical configuration and said sealing surface has a substantially spheroidal configuration.

4. The system of claim 1 wherein said valve element is solid and extends beyond said seating surface away from said valve body element when said sealing surface contacts said seating surface to prevent condiment flow through said through opening.

5. The system of claim 1 wherein said valve element is secured to said valve body element so as to have a bias to prevent condiment flow through said through opening.

6. The system of claim 1 wherein said valve element is made of a material which is softer than the material from which said valve seat element is made.

7. The system of claim 1 wherein said valve element includes a core surrounded by an outer covering, said core being made of a material which is harder than the material from which said outer covering is made, said outer covering including said sealing surface.

8. The system of claim 1 wherein said valve seat element, said valve body element and said valve element together define a walled open ended, substantially annular space adjacent said sealing surface when said sealing surface contacts said seating surface to prevent condiment flow through said through opening.

9. The system of claim 1 wherein said valve seat element and said valve body element are operatively coupled along a tortuous path of mutually engaging surfaces.

10. A method for dispensing condiment comprising:
   providing a supply of condiment to be dispensed;
   pumping condiment from said supply of condiment through an inlet conduit in communication with said supply of condiment to an outlet conduit on the discharge side of a pump mechanism, said inlet conduit containing an inlet valve positioned to allow condiment flow from said supply of condiment across said inlet valve and to prevent condiment flow to said supply of condiment across said inlet valve; and
   passing condiment from said outlet conduit, as desired, said outlet conduit containing an outlet valve positioned to allow condiment flow for said passing across said outlet valve and to prevent back flow of condiment to said pump mechanism across said outlet valve, each of said inlet valve and said outlet valve comprising:
   a valve seat element having a longitudinal axis, defining a through opening and including a seating surface which defines a portion of said through opening;
   a valve body element positioned in said pump inlet or said pump outlet and operatively coupled to said valve seat and located at least partially in said through opening, said valve body element including an inwardly facing interior sidewall; and
   a valve element secured to said valve body element at said inwardly facing interior sidewall and being movable relative to said valve body element, said valve element including a sealing surface which is curved in at least one plane including the longitudinal axis of said valve seat element and is adapted to contact said seating surface to prevent condiment flow through said through opening.

11. The method of claim 10 wherein said condiment contains particles.

12. The method of claim 11 wherein said pump mechanism comprises a gas driven diaphragm pump.

13. A system for dispensing a condiment comprising:

a condiment reservoir containing a supply of condiment to be dispensed;

a pump sub-system including a pump inlet in communication with said condiment reservoir, a pump outlet and a pump assembly for pumping condiment from said condiment reservoir through said pump inlet and through said pump outlet; and a valved conduit in communication with said pump outlet and structured to allow condiment from said pump outlet to flow therethrough, as desired, each of said pump inlet and said pump outlet including a valve comprising:

a valve seat element having a longitudinal axis, defining a through opening and including a seating surface which defines a portion of said through opening;

a valve body element positioned in said inlet or said outlet and operatively coupled to said valve seat element and located at least partially in said through opening; and a valve element integrally formed with and movable relative to said valve body element, said valve element including a sealing surface which is curved in at least one plane including the longitudinal axis of said valve seat element and is adapted to contact said seating surface to prevent condiment flow through said through opening.

14. The system of claim 13 wherein said seating surface is angled in at least one plane including the longitudinal axis of said valve seat element.

15. The system of claim 13 wherein said seating surface has as substantially conical configuration and said sealing surface has a substantially spheroidal configuration.

16. The system of claim 13 wherein said valve element is made of a material which is softer than the material from which said valve seat element is made.

17. The system of claim 13 wherein said valve element includes a substantially flat surface located proximally of the distal most portion of said sealing surface.

18. The system of claim 13 wherein said valve seat element and said valve body element are operatively coupled along a tortuous path of mutually engaging surfaces.

* * * * *